(12) United States Patent
Mendel et al.

(10) Patent No.: US 9,996,786 B1
(45) Date of Patent: Jun. 12, 2018

(54) METHOD AND APPARATUS FOR USING NON-UNIFORM UNDER SAMPLING TO ACHIEVE A SOFTWARE DEFINED RADIO FOR NFC APPLICATIONS

(71) Applicant: NXP B.V., Eindhoven (NL)

(72) Inventors: Stefan Mendel, Graz (AT); Ulrich Andreas Muehlmann, Gratkorn (AT); Dominik Kurzmann, Kapfenberg (AT)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/630,823

(22) Filed: Jun. 22, 2017

(51) Int. Cl.
| | | |
|---|---|---|
| H04B 1/16 | (2006.01) | |
| H04B 5/00 | (2006.01) | |
| H04L 27/38 | (2006.01) | |
| G06K 19/07 | (2006.01) | |
| G06K 19/077 | (2006.01) | |
| H04W 4/00 | (2018.01) | |

(52) U.S. Cl.
CPC ... *G06K 19/0724* (2013.01); *G06K 19/07749* (2013.01); *H04B 5/0031* (2013.01); *H04B 5/0075* (2013.01); *H04W 4/008* (2013.01)

(58) Field of Classification Search
CPC .... H04B 5/0075; H04B 5/0031; H04B 3/232; H04B 1/16; H04W 4/008; H04L 27/2338; H04L 27/3881; H04L 27/2085; G06K 19/0724
See application file for complete search history.

(56) References Cited

U.S. PATENT DOCUMENTS

| | | | | |
|---|---|---|---|---|
| 5,454,007 A | * | 9/1995 | Dutta | H03D 3/007 329/341 |
| 2004/0120413 A1 | * | 6/2004 | Park | H04L 27/2607 375/260 |
| 2006/0003729 A1 | * | 1/2006 | Tuttle | H04B 1/18 455/333 |
| 2007/0001891 A1 | * | 1/2007 | Mazhar | H03M 1/1225 341/161 |
| 2007/0140382 A1 | * | 6/2007 | Qian | H04B 1/30 375/332 |
| 2008/0048726 A1 | * | 2/2008 | Hafed | G01R 31/2882 327/9 |
| 2008/0201597 A1 | * | 8/2008 | Chong | G11C 7/1066 713/401 |

(Continued)

OTHER PUBLICATIONS

Darwhekar et al., a 45nm CMOS Near-Field Comm.Radio with 0.15A/m RX Sensitivity & 4mA Current Cons.in Card Emulation Mode Bangalore, 2013.

(Continued)

*Primary Examiner* — Andrew Wendell (57) ABSTRACT

Various embodiments relate to a method and apparatus for a method for under sampling a RF carrier signal, the method including receiving, by an analog digital converter, the RF carrier signal, selecting, by a multiplexer, a clock signal which includes a first clock signal and a second clock signal which are phase shifted, receiving, by the ADC, the clock signal which has a frequency less that the frequency of the RF carrier signal, sampling, by the ADC, the RF carrier signal using the selected clock signal and demodulating, by a digital signal processor, the RF carrier signal into I channel data and Q channel data for I/Q demodulation.

16 Claims, 6 Drawing Sheets

(56) References Cited

U.S. PATENT DOCUMENTS

| | | | | |
|---|---|---|---|---|
| 2008/0225168 | A1* | 9/2008 | Ouslis | H04N 5/4401 |
| | | | | 348/554 |
| 2014/0064339 | A1* | 3/2014 | Kim | H04L 5/0051 |
| | | | | 375/219 |
| 2014/0072024 | A1* | 3/2014 | Warke | H04L 27/0014 |
| | | | | 375/232 |
| 2015/0139122 | A1* | 5/2015 | Rimini | H04B 1/123 |
| | | | | 370/329 |
| 2016/0380642 | A1* | 12/2016 | Wu | G06F 1/022 |
| | | | | 327/117 |

OTHER PUBLICATIONS

Morris et al., A 90nm CMOS 13.56MHz NFC Transceiver Nov. 16-18, 2009 / Taipei, Taiwan.

Lien, A Self-Calibrating NFC SoC with a Triple-Mode Reconfigurable PLL and a Single-Path PICC-PCD Receiver in 0.11 μm CMOS, Singapore, 2014.

Jeong et al., Multi-Band Multi-Mode Wireless Connectivity SoC for 802.11 alblgln, BT 4.0 and NFC Seongnam, Korea 2014.

Zhang et al., NFC quadrature carrier canceling receiver design and implementation Shanghai 201203,China 201.

* cited by examiner

METHOD AND APPARATUS FOR USING NON-UNIFORM UNDER SAMPLING TO ACHIEVE A SOFTWARE DEFINED RADIO FOR NFC APPLICATIONS

TECHNICAL FIELD

This disclosure relates generally to method for under sampling a signal, and more specifically, but not exclusively, to a Near Field Communication ("NFC") integrated circuit which under samples a signal carrier using a clock signal which reduces the sampling frequency of an Analog to Digital Converter ("ADC").

BACKGROUND

The current analog front-end integrated circuits include complex parts for signal preconditioning, such as mixers or baseband amplifiers (BBAs), which either amplify or attenuate the received signal before digitizing it with the two separate ADCs.

Figure 1:
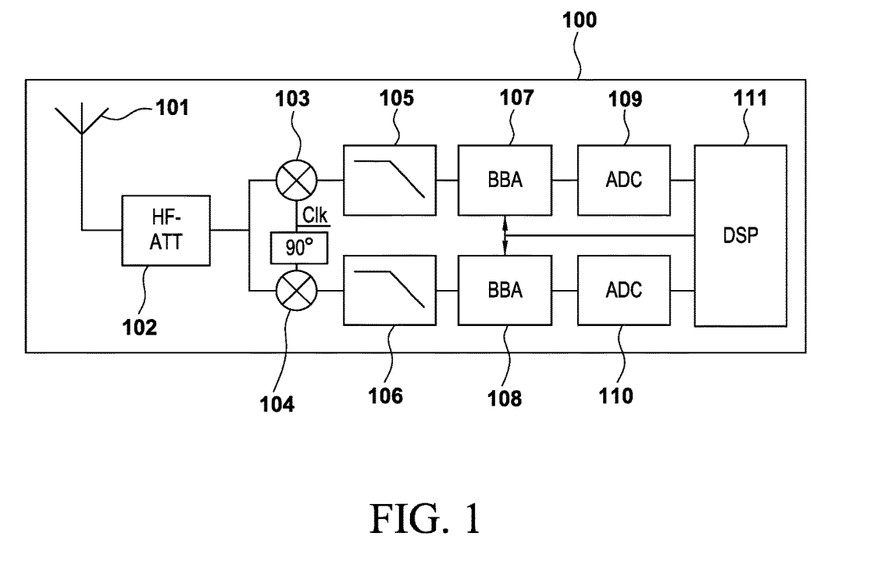
FIG. 1 illustrates a block diagram of an integrated circuit.

As illustrated in FIG. 1, the integrated circuit 100 may include an antenna 101, a High Frequency Attenuator ("HF-ATT") 102, two mixers 103 and 104, two low passes 105, 106, two BBAs 107, 108, two ADCs 109, 110, and a DSP 111.

As two signal paths are inherently mandatory, every function needs to be implemented twice, which adds redundancy to the system. The reason for having two signal paths is that the transmitted information can either be situated in the amplitude or phase of the carrier signal or in both of them.

Therefore I/Q demodulation is required for reconstruction of the transmitted signal in order to obtain the necessary data.

The two ADCs 109 and 110 are required which cost more chip space and power consumption and because the integrated circuit 100 needs to produce two clocks where one clock is 90° phase shifted from the other, there is a lag time in the phase shifted channel which adds additional noise to the signal which contributes to a lower SNR.

Further, the mixers 103 and 104 in FIG. 1 can exhibit poor power supply rejection which adds additional noise to the signal and the mixers 103 and 104 can perform phase noise to amplitude noise conversion due to the uncertainty of the clock signal.

SUMMARY OF EXEMPLARY EMBODIMENTS

A brief summary of various embodiments is presented below. Embodiments address the need to create an integrated circuit which utilizes a single ADC which samples at a reduced speed to accomplish the necessary function without cumbersome analog signal preconditioning using redundant parts.

In order to overcome these and other shortcomings of the prior art and in light of the present need to create an integrated circuit which utilizes a single ADC which samples at a reduced speed, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a method for under sampling a RF carrier signal, the method including receiving, by an analog digital converter ("ADC"), the RF carrier signal, selecting, by a multiplexer, a clock signal which includes a first clock signal and a second clock signal which is phase shifted from the first clock signal, receiving, by the ADC, the selected clock signal which has a frequency less than the frequency of the RF carrier signal, sampling, by the ADC, the RF carrier signal using the selected clock signal and demodulating, by a digital signal processor ("DSP"), the RF carrier signal.

In an embodiment of the present disclosure, the method further including outputting, by a local oscillator, a clock select signal to the multiplexer.

In an embodiment of the present disclosure, sampling by the ADC is delayed by one fourth of a carrier period.

In an embodiment of the present disclosure, phase shift between I channel data and the Q channel data is 90 degrees.

In an embodiment of the present disclosure, the clock signal selected by the multiplexer is the same frequency as the clock select signal by the local oscillator.

In an embodiment of the present disclosure, the multiplexer selects the first clock when the second clock signal is idle and selects the second clock signal when the first clock signal is idle.

In an embodiment of the present disclosure, the multiplexer outputs to the ADC the at least one of the first clock signal and the second clock signal based on the clock select signal.

In an embodiment of the present disclosure, the ADC receives the RF carrier signal from an RF channel.

Various embodiments described herein relate to an integrated circuit for under sampling a RF carrier signal, the integrated circuit including an analog digital converter ("ADC") configured to receive the RF carrier signal, a multiplexer configured to select a clock signal which includes a first clock signal and a second clock signal which is phase shifted from the first clock signal, the ADC configured to receive the selected clock signal which has a frequency less that the frequency of the RF carrier signal, the ADC configured to sample the RF carrier signal using the selected clock signal; and a digital signal processor ("DSP") configured to demodulate the RF carrier signal.

In an embodiment of the present disclosure, the integrated circuit, further including a local oscillator configured to output a clock select signal to the multiplexer.

In an embodiment of the present disclosure, sampling by the ADC is delayed by 4+¼ of a carrier period.

In an embodiment of the present disclosure, phase shift between I channel data and the Q channel data is 90 degrees.

In an embodiment of the present disclosure, the clock signal selected by the multiplexer is the same frequency as the clock select signal by the local oscillator.

In an embodiment of the present disclosure, the multiplexer selects the first clock when the second clock signal is idle and selects the second clock signal when the first clock signal is idle.

In an embodiment of the present disclosure, the multiplexer outputs to the ADC at least one of the first clock signal and the second clock signal based on the clock select signal.

In an embodiment of the present disclosure, the ADC receives the RF carrier signal from an RF channel.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

In the integrated circuit in FIG. 1, the analog signal preconditioning parts and the second ADC require additional space and consume energy. These parts may be removed from the circuit as well as the second ADC by implementing the integrated circuit of the current embodiment.

Current NFC applications use bitrates up to 848 kbit/s ("HBR") which is sufficient for most use cases. While the current embodiments are directed to NFC applications, they may be applied in other applications with different bitrates.

An analogue front-end design of the current embodiment omits the signal preconditioning part of the integrated circuit of FIG. 1. The current embodiment is directed towards a software defined radio ("SDR") system which performs the signal preconditioning processes previously performed by the signal preconditioning parts.

A reduced ADC block may be implemented, that may only support bitrates up to 848 kb/s. By omitting very high bitrates (VHBR), which is defined as bitrates greater than 848 kb/s and less than 6.8 Mb/s, an ADC structure may be implemented which serves moderate-speed applications, such as ticketing, authorization and NFC payments.

The integrated circuit design of the current embodiment utilizes a single ADC that samples at a reduced speed but is able to achieve performance levels of the integrated circuit disclosed in FIG. 1.

Figure 2:
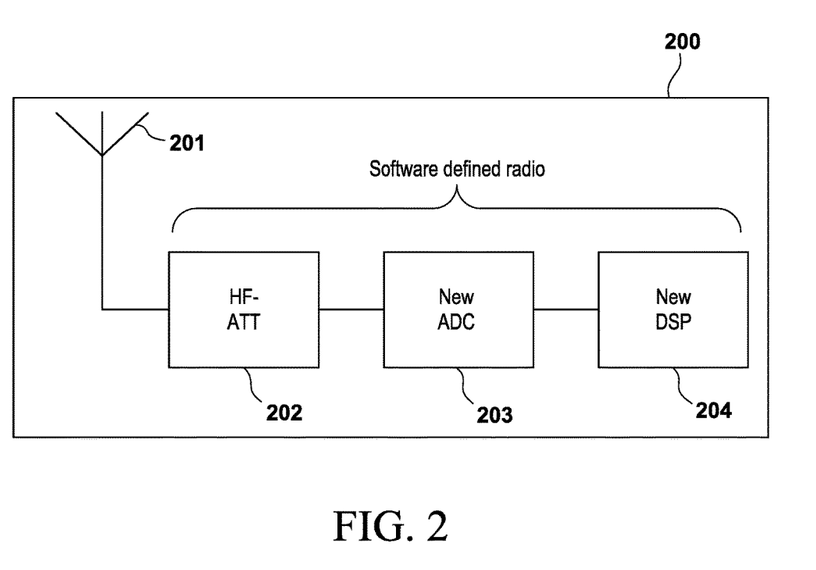
FIG. 2 illustrates a block diagram of an integrated circuit of the current embodiment.

FIG. 2 illustrates a block diagram of the integrated circuit of the current embodiment. The integrated circuit 200 may include an antenna 201, a High Frequency Attenuator ("HF-ATT") 202, an ADC 203 and a Digital Signal Processor ("DSP") 204. The Software Defined Radio ("SDR") may include the HF-ATT 202, the ADC 203 and the DSP 204.

As all analog responsibilities, including mixing and demodulating may be performed by the DSP 204 of the integrated circuit 200, the signal preconditioning blocks (i.e. low pass, mixer, BBA) may be omitted from the integrated circuit 200 of the current embodiment.

For example, the integrated circuit of the present embodiment under samples the RF carrier frequency of 13.56 MHz, as it does not contain any useful data and therefore much of the RF carrier signal can be neglected.

The ADC 203 is clocked with 3.39 MHz which is one fourth of the RF carrier frequency and four times of the maximum supported data rate of 848 kbit/s. For example, if the RF carrier signal is received by the RF channel at 13.56 MHz, then the frequency is clocked by the ADC to one fourth of that frequency, in this example, to 3.39 MHz.

Figure 3:
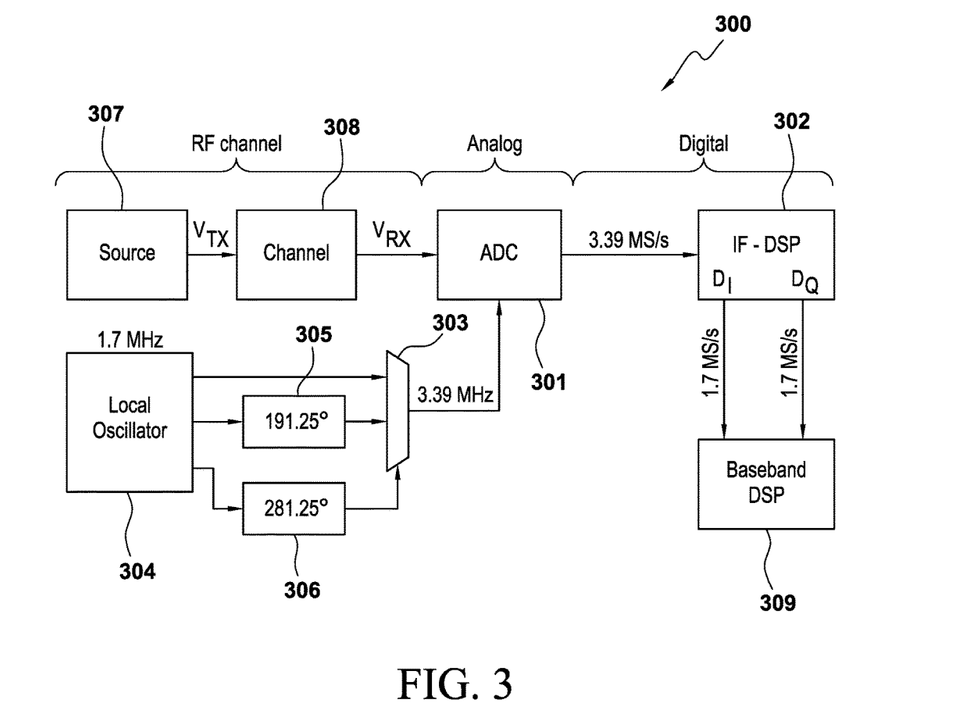
FIG. 3 illustrates a functional block diagram of an integrated circuit architecture.

FIG. 3 illustrates a block diagram of the architecture 300 for the integrated circuit 200. In the architecture 300, a single ADC 301 is utilized for sampling the input voltage. This ADC 301 is utilized to sample both I channel data and Q channel data, both of which are necessary for I/Q demodulation in the DSP 302. The intermediate frequency digital signal processor (IF-DSP) 302 outputs demodulated I and Q signals. For example, the 3.39 MHz signal is demodulated into $D_I$ channel data at 1.7 MHz and $D_Q$ channel data at 1.7 MHz, which is input into the baseband DSP 309. The IF-DSP 302 and baseband DSP 309 may be implemented as separate circuited or as a single circuit.

When a constant frequency signal, for example, 3.39 MHz is output from the multiplexer 303 and sampling is always at the same amplitude of the carrier signal as the carries signal is an integer multiple of the sampling signal. However, a constant frequency cannot be used when both phase information and amplitude information must be separated in two channels for demodulation, which is why a constant frequency, for example, 3.39 MHz, is not suitable for this architecture 300.

Therefore, the clock for this architecture 300 provides a sampling signal that triggers the ADC 301 to sample at the different times to receive both amplitude and phase information in a first channel and a second channel.

For example. FIG. 3 illustrates an RF channel that includes a source 307 and a channel 308 which outputs the RF channel signal to the ADC 301.

FIG. 3 further illustrates a local oscillator which outputs a first clock signal at 1.7 MHz, which is input directly into the multiplexer 303. The local oscillator also outputs a signal which is defined as a second clock 305 (phase shifted 191.25° from the first clock) and a clock select signal 306 (phase shifted 281.25° from the first clock) both of which are input into the multiplexer 303.

Figure 4:
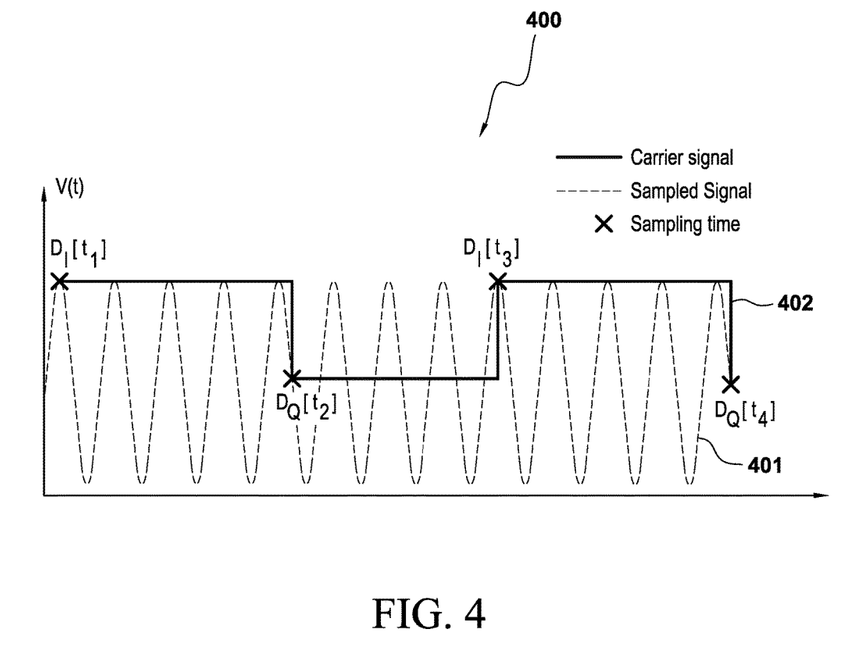
FIG. 4 illustrates a sampling graph of the clock.

The multiplexer 303 then switches between the first clock and the second clock 305, which is defined in FIG. 4.

FIG. 4 illustrates a graph 400 which shows the different sampling times for the non-uniform under sampling architecture 300 to function.

For example, the carrier signal 401 ($f_C$=13.56 MHz) is under sampled, by delaying every second sampling point by 4+¼ of a carrier period to achieve the necessary 90° phase shift between both channels. In fact, the phase shift is four times the carrier period plus 90°, but as four times the carrier period is 0°, it becomes 90°.

The sampling signal 402 includes odd sampling points ($D_I[t_1]$ and $D_I[t_3]$) at $t_1$ and $t_3$, which represents the data for the I channel and even sampling points ($D_Q[t_2]$ and $D_Q[t_4]$) at $t_2$ and $t_4$ which represent the data for the Q channel. FIG. 3 illustrates that the separation of the data stream, between I channel data and Q channel data is performed in the IF-DSP 302.

The phase shift between $D_I$ and $D_Q$ is exactly $$4 + \frac{1}{4}$$

carrier periods which is exactly 191.25° with respect to the 1.7 MHz first clock signal.

Figure 5:
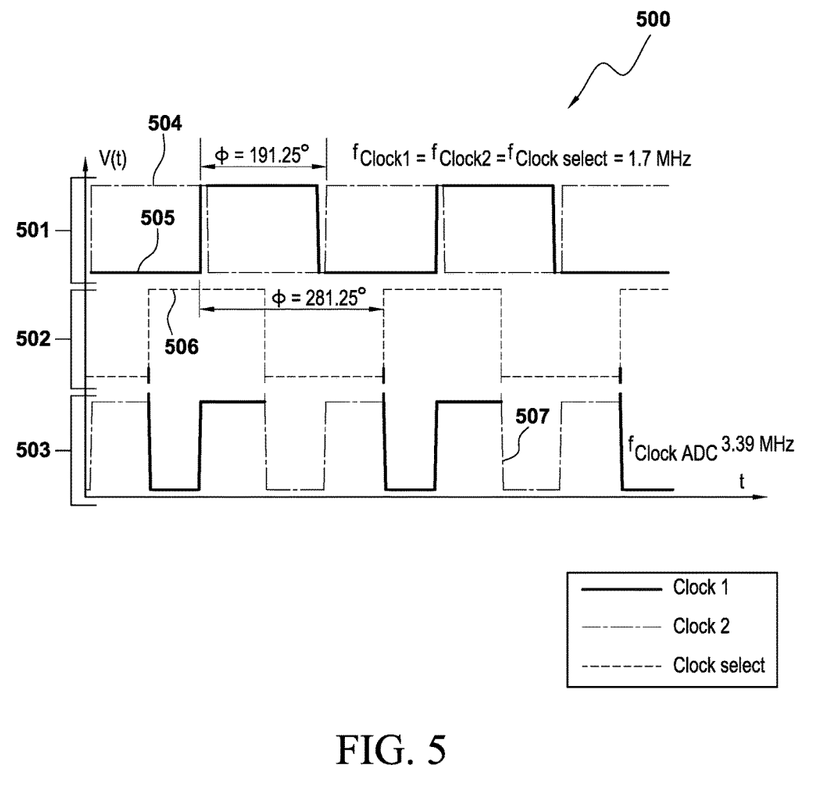
FIG. 5 illustrates a signal flow diagram.

FIG. 5 illustrates the principle of operation of the clock generation 500.

For example, in FIG. 5, the upper part 501 of FIG. 5 illustrates the first clock signal 505 and second clock signal 504 shifted $\varphi_{Clock1 \to Clock2} = 191.25°$ to each other.

Clock signals, the first clock signal 505 and second clock signal 504, are used as input for the multiplexer 303.

For example, the frequency of each clock signal is one half of the necessary ADC clock frequency. The first clock signal 505 and second clock signal 504 are 1.7 MHz which is exactly one half of the necessary ADC clock frequency, which is 3.39 MHz.

The middle part 502 of FIG. 5 shows the clock select signal 506 for the multiplexer 303. The clock select signal 506 has the same frequency as the first clock signal 505 and the second clock signal 504 of 1.7 MHz.

The phase shift of the second clock signal 504 is $\varphi_{Clock1 \to Second\ Clock\ select} = 191.25°$. The phase shift of the clock select signal 506 is $\varphi_{Clock1 \to Clock\ select} = 281.25°$.

The phase shift of the clock select signal 506 was set to be as centered as possible with respect to the edge location of first clock and second clock signal, therefore, when the multiplexer is switching between two channels, it always switches within the idle section of both clock signals (i.e., the first clock signal 505 and the second clock signal 504).

Other phase shifts values may be used as well.

For example, when the first clock signal 505 is selected (i.e. clock select=binary high=1), the first clock signal 505 is idle and when the second clock signal 504 is selected (i.e. clock select=binary low=0), the second clock signal 504 is idle.

By ensuring the phase shift of the first clock signal 505 is centered, when a rising edge of one clock appears (activates the sampling procedure), the multiplexer 303 has already safely switched to the correct input (i.e., chosen clock input).

The bottom part 503 of FIG. 5 illustrates the resulting ADC clock signal.

The frequency of the resulting ADC clock signal is doubled, for example, from 1.7 MHz to 3.39 MHz.

The ADC clock signal 507 represents a signal with varying duty cycle due to the phase shifts.

Because of the fact that the ADC clock signal is non-uniform, several ADC technologies cannot be used for this receiver architecture, such as sigma delta ADCs. Therefore, mainly SAR ADCs are candidates for this receiver architecture.

Figure 6:
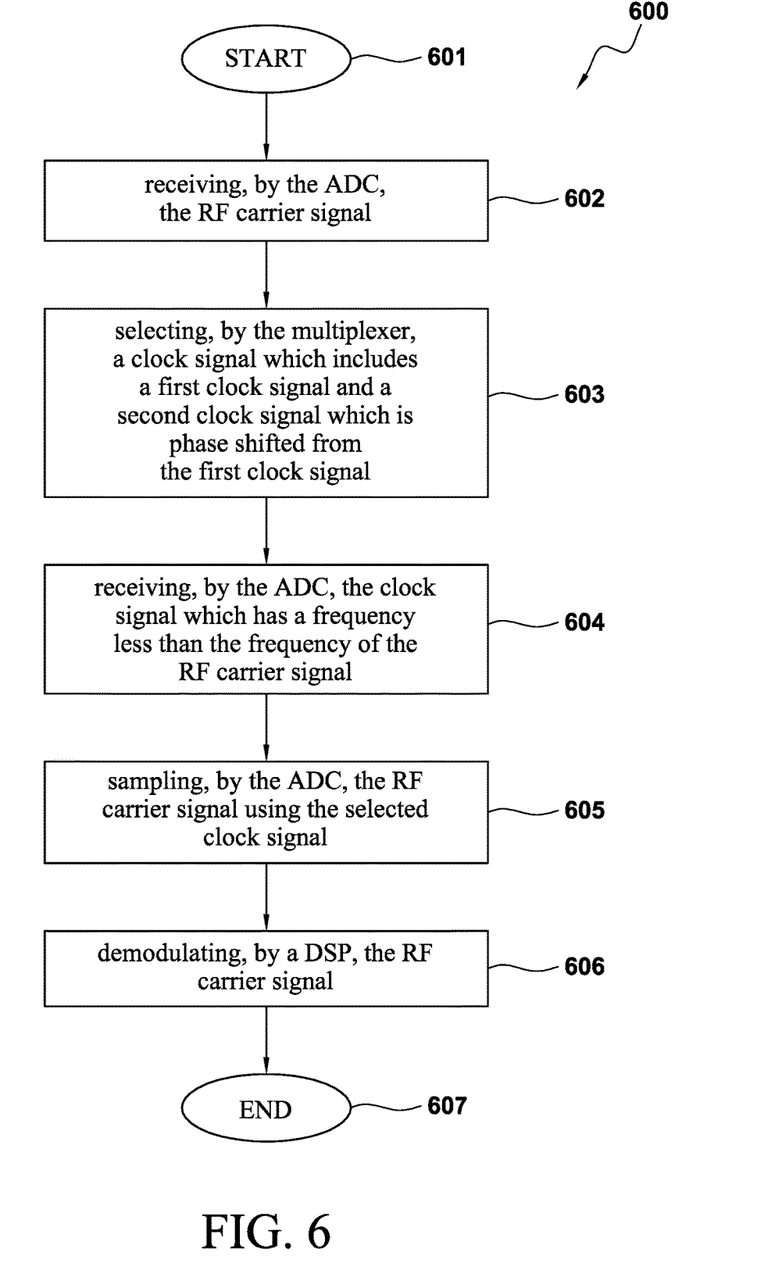
FIG. 6 illustrates a flow chart of the method for under sampling a signal.

FIG. 6 illustrates a method for under sampling a signal 600.

The method for under sampling a signal 600 begins at step 601 and proceeds to step 602 which receives, by the ADC, the RF carrier signal.

The method for under sampling a signal 600 then proceeds to step 603 which selects, by the multiplexer, a clock signal which includes a first clock signal and a second clock signal which are phase shifted 191.25°.

The method for under sampling a signal 600 then proceeds to step 604 which receives, by the ADC, the clock signal which has a frequency less than the frequency of the RF carrier signal.

The method for under sampling a signal 600 then proceeds to step 605 which samples, by the ADC, the RF carrier signal using the selected clock signal.

The method for under sampling a signal 600 then proceeds to step 606 which demodulates, by the DSP, the RF carrier signal into I channel data and Q channel data for I/Q demodulation.

The method for under sampling a signal 600 then proceeds to step 607 to end.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for under sampling a RF carrier signal, the method comprising:
   receiving, by an analog digital converter ("ADC"), the RF carrier signal;
   selecting, by a multiplexer, a clock signal which includes a first clock signal and a second clock signal which is phase shifted from the first clock signal;
   receiving, by the ADC, the selected clock signal which has a frequency less than the frequency of the RF carrier signal;
   sampling, by the ADC, the RF carrier signal using the selected clock signal; and
   demodulating, by a digital signal processor ("DSP"), the RF carrier signal.

2. The method of claim 1, further comprising:
   outputting, by a local oscillator, a clock select signal to the multiplexer.

3. The method of claim 1, wherein sampling by the ADC is delayed by one fourth of a carrier period.

4. The method of claim 1, wherein phase shift between I channel data and the Q channel data is 90 degrees.

5. The method of claim 2, wherein the clock signal selected by the multiplexer is the same frequency as the clock select signal by the local oscillator.

6. The method of claim 1, wherein the multiplexer selects the first clock when the second clock signal is idle and selects the second clock signal when the first clock signal is idle.

7. The method of claim 2, wherein the multiplexer outputs to the ADC the at least one of the first clock signal and the second clock signal based on the clock select signal.

8. The method of claim 1, wherein the ADC receives the RF carrier signal from an RF channel.

9. An integrated circuit for under sampling a RF carrier signal, the integrated circuit comprising:
   an analog digital converter ("ADC") configured to receive the RF carrier signal;
   a multiplexer configured to select a clock signal which includes a first clock signal and a second clock signal which is phase shifted from the first clock signal;
   the ADC configured to receive the selected clock signal which has a frequency less that the frequency of the RF carrier signal;
   the ADC configured to sample the RF carrier signal using the selected clock signal; and
   a digital signal processor ("DSP") configured to demodulate the RF carrier signal.

10. The integrated circuit of claim 9, further comprising a local oscillator configured to output a clock select signal to the multiplexer.

11. The integrated circuit of claim 9, wherein sampling by the ADC is delayed by 4+¼ of a carrier period.

12. The integrated circuit of claim 9, wherein phase shift between I channel data and the Q channel data is 90 degrees.

13. The integrated circuit of claim 10, wherein the clock signal selected by the multiplexer is the same frequency as the clock select signal by the local oscillator.

14. The integrated circuit of claim 9, wherein the multiplexer selects the first clock when the second clock signal is idle and selects the second clock signal when the first clock signal is idle.

15. The integrated circuit of claim 10, wherein the multiplexer outputs to the ADC at least one of the first clock signal and the second clock signal based on the clock select signal.

16. The integrated circuit of claim 9, wherein the ADC receives the RF carrier signal from an RF channel.

* * * * *